M. SATTLEY.
WHEEL-PLOW.

No. 173,138.  Patented Feb. 8, 1876.

WITNESSES:
Jno. W. Lyon.
Levi P. Graham

INVENTOR:
Marshall Sattley.
Per Chas P. Houmann.
Atty

UNITED STATES PATENT OFFICE.

MARSHALL SATTLEY, OF TAYLORVILLE, ILLINOIS.

IMPROVEMENT IN WHEEL-PLOWS.

Specification forming part of Letters Patent No. 173,138, dated February 8, 1876; application filed November 8, 1875.

*To all whom it may concern:*

Be it known that I, MARSHALL SATTLEY, of Taylorville, in the county of Christian and State of Illinois, have invented a new and useful Improvement in Riding-Plows, which improvement is fully set forth in the following specification, reference being had to the accompanying drawings.

The object of my invention is, first, to so construct the frame of iron to give it strength; second, consists of a bell-crank lever and a sliding support pivoted on the plow-beam to raise and lower the plow from the ground; third, pivoted draft-bars attaching the plow-beam to the main frame, allowing the frame and beam to adjust themselves on rough ground, and with the draft directly on the pivoted draft-bars; and, fourth, a bell-crank lever, toothed segment and slide on the main frame to raise and lower the wheels on the frame, and regulate the depth of the plow in the ground.

Figure 1:
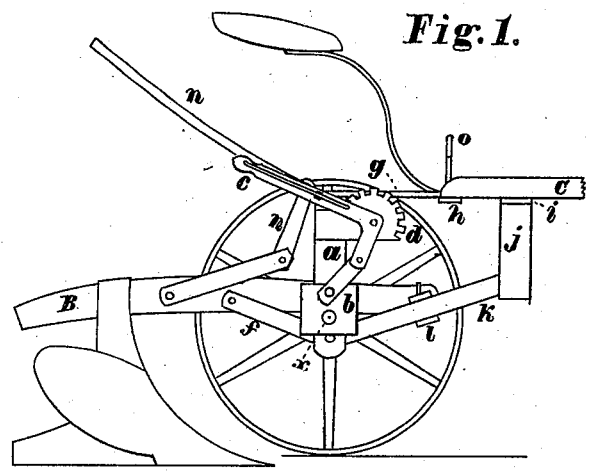
Figure 2:
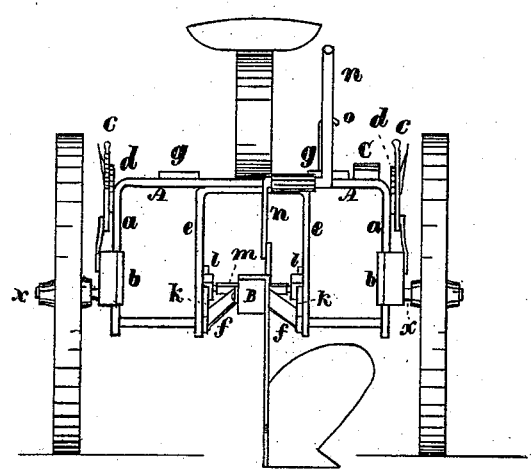
Figure 3:
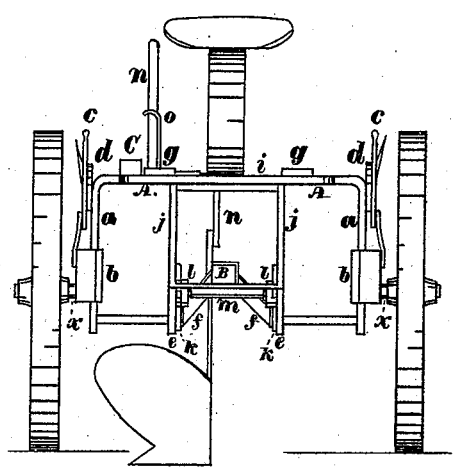

Figure 1 is a side elevation of a riding-plow embodying my invention. Fig. 2 is a rear elevation of the same, and Fig. 3 is a front elevation of Fig. 1.

A is the main frame bent at right angles at $a\,a$, on which are the slides $b\,b$, which are raised and lowered by the bell-crank levers $c\,c$, and the levers secured by a spring-catch in in the toothed segments $d\,d$. The axles $x\,x$ are secured in and make a part of the slides $b\,b$, by which devices the frame is adjusted and the depth of the plow in the ground regulated. $e\,e$ are perpendicular bars attached to the main frame A. $f\,f$ are draft-bars pivoted to the plow-beam B and to the bars $e\,e$. By this arrangement the draft is directly on these braces from the main frame to the plow-beam and close to the plow. $g\,g$ are longitudinal bars supporting the transverse bars $h$ and $i$ and the tongue C. $j$ is a bar attached to the transverse bar $i$, and forming therewith a rectangle, the lower transverse bar of which is provided with holes, to which a clevis and the double-tree or an equalizer is attached. $k\,k$ are diagonal braces attached to the rectangle $j$, and to the perpendicular bars $e\,e$. $l\,l$ are slides on the diagonal braces. A bar, $m$, is pivoted in the slides, and the plow-beam attached to the pivoted bar. $n$ is a bell-crank lever by which the beam and plow are raised and lowered. The lever when the plow is raised is caught in the hook $o$.

In raising and lowering the plow-beam, and when the plow strikes an obstruction, the slides $l\,l$ and pivoted draft-bars $f\,f$ allow the plow-beam to rise, returning after passing over the obstruction.

The diagonal braces $k\,k$ serve the double purpose of strengthening the frame, and supporting the slides $l\,l$.

I claim as my invention—

1. In a riding-plow, the combination of the main frame A $g\,h\,i$, with the vertical bars $e\,e$, rectangular frame $j$, and diagonal braces $k\,k$, substantially as described.

2. The diagonal braces $k\,k$, slides $l\,l$, pivoted bar $m$, and pivoted draft-bars $f\,f$, in combination with the plow-beam B, and perpendicular bars $e\,e$, substantially as described.

3. The combination of the bell-crank lever $n$, pivoted draft-bars $f\,f$, plow-beam B, pivoted bar $m$, slides $l\,l$, and diagonal braces $k\,k$, substantially as described.

MARSHALL SATTLEY.

Witnesses:
WILLIAM JACOB ETTINGER,
ARCHIBALD SATTLEY,
CHARLES E. JOHNSON.